United States Patent
Zhao et al.

(10) Patent No.: US 12,395,989 B2
(45) Date of Patent: Aug. 19, 2025

(54) METHOD PERFORMED BY USER EQUIPMENT, AND USER EQUIPMENT

(71) Applicant: Sharp Kabushiki Kaisha, Osaka (JP)

(72) Inventors: Yinan Zhao, Shanghai (CN); Renmao Liu, Shanghai (CN); Chao Luo, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 470 days.

(21) Appl. No.: 17/914,410

(22) PCT Filed: Mar. 31, 2021

(86) PCT No.: PCT/CN2021/084470
§ 371 (c)(1),
(2) Date: Sep. 26, 2022

(87) PCT Pub. No.: WO2021/197382
PCT Pub. Date: Oct. 7, 2021

(65) Prior Publication Data
US 2023/0107902 A1    Apr. 6, 2023

(30) Foreign Application Priority Data
Apr. 3, 2020   (CN) .......................... 202010262843.4

(51) Int. Cl.
*H04L 12/00* (2006.01)
*H04W 72/1263* (2023.01)
*H04W 72/20* (2023.01)

(52) U.S. Cl.
CPC ....... *H04W 72/20* (2023.01); *H04W 72/1263* (2013.01)

(58) Field of Classification Search
CPC .................. H04W 72/20; H04W 72/1263; H04W 4/40; H04W 72/232; H04W 72/40; H04W 72/25; H04W 72/0453; H04W 72/0446
(Continued)

(56) References Cited

U.S. PATENT DOCUMENTS 11,553,458 B2 *  1/2023  Ryu .................... H04W 72/02
11,553,493 B2 *  1/2023  Akkarakaran ..... H04B 7/06954
(Continued)

FOREIGN PATENT DOCUMENTS

CN     110519030 A         11/2019
WO     WO-2017171526 A1 *  10/2017  .......... H04L 5/0042
WO     WO-2023282663 A2 *  1/2023   .......... H04L 5/0042

OTHER PUBLICATIONS

Apple, "Remaining Details on Mode 1 Resource Allocation", 3GPP TSG RAN WG1 #100-e e-Meeting, R1-2000851, Feb. 24-Mar. 6, 2020, 7 pages.
Official Communication issued in International Patent Application No. PCT/CN2021/084470, mailed on Jun. 29, 2021.
(Continued)

*Primary Examiner* — Frantz Coby
(74) *Attorney, Agent, or Firm* — Keating & Bennett, LLP

(57) ABSTRACT

Provided in the present invention are a method performed by user equipment, and user equipment. The method includes: determining the maximum number $N_{max}$ of sidelink resources reserved for one sidelink transmission; receiving sidelink scheduling information transmitted by a base station; determining an index or number f2 of a lowest sub-channel of a second sidelink resource, and the number m of sub-channels in a sidelink frequency domain resource assignment, and/or an index f3 of a lowest sub-channel of a third sidelink resource; and determining a value r' of a frequency domain resource indication field in a sidelink control information (SCI) format 0-1.

2 Claims, 5 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 11,588,581 | B2 * | 2/2023 | Yeo | H04L 5/0053 |
| 11,791,937 | B2 * | 10/2023 | Yeo | H04L 27/2607 |
| | | | | 370/329 |
| 11,943,168 | B2 * | 3/2024 | Yeo | H04W 72/569 |
| 2016/0073408 | A1 | 3/2016 | Sartori et al. | |
| 2021/0112582 | A1 * | 4/2021 | Lee | H04W 72/535 |
| 2021/0400655 | A1 * | 12/2021 | Fong | H04W 72/20 |
| 2022/0070779 | A1 * | 3/2022 | Li | H04W 76/14 |
| 2022/0330261 | A1 * | 10/2022 | Yeo | H04W 72/543 |
| 2023/0011514 | A1 * | 1/2023 | Wang | H04W 72/569 |
| 2023/0032608 | A1 * | 2/2023 | Li | H04W 72/52 |
| 2023/0036146 | A1 * | 2/2023 | Xue | H04W 72/20 |
| 2023/0180211 | A1 * | 6/2023 | Sarkis | H04L 5/0092 |
| | | | | 370/329 |
| 2023/0403737 | A1 * | 12/2023 | Mohammad Soleymani | |
| | | | | H04W 76/14 |

OTHER PUBLICATIONS

Intel Corporation, "Outcome of email thread [100e-NR-5G_V2X_NRSL-RA_Mode2-03]", 3GPP TSG RAN WG1 Meeting #100-E, R1-2001346, Feb. 24-Mar. 6, 2020, 12 pages.
MCC Support, "Final Report of 3GPP TSG RAN WG1 #98bis v2.0.0", 3GPP TSG RAN WG1 Meeting #99, R1-1913275, Nov. 18-22, 2019, pp. 1-160.
MCC Support, "Final Report of 3GPP TSG RAN WG1 #98 v2.0.0", 3GPP TSG RAN WG1 Meeting #98bis, R1-1911429 Oct. 14-18, 2019, pp. 1-180.
Vodafone, "New SID: Study on NR V2X", 3GPP TSG RAN Meeting #80, RP-181429, Jun. 11-14, 2018, 5 pages.
Huawei et al., "New WID on 3GPP V2X Phase 2", 3GPP TSG RAN Meeting #75, RP-170798, Mar. 609, 2017, 5 pages.
LG Electronics et al., "New WI proposal: Support for V2V services based on LTE sidelink", 3GPP TSG RAN Meeting #70, RP-152293, Dec. 7-10, 2015, 8 pages.
Qualcomm Incorporated, "Work Item Proposal for Enhanced LTE Device to Device Proximity Services", 3GPP TSG RAN Meeting #66, RP-142311, Dec. 8-11, 2014, 8 pages.
Qualcomm Incorporated, "Work item proposal on LTE Device to Device Proximity Services", 3GPP TSG RAN Meeting #63, RP-140518, Mar. 3-6, 2014, 7 pages.

* cited by examiner

METHOD PERFORMED BY USER EQUIPMENT, AND USER EQUIPMENT

TECHNICAL FIELD

The present invention relates to the technical field of wireless communications, and in particular to a method performed by user equipment, and corresponding user equipment.

BACKGROUND

In conventional cellular networks, all communication needs to be forwarded via base stations. By contrast, D2D communication (device-to-device communication) refers to a technique in which two user equipment units directly communicate with each other without needing a base station or a core network to perform forwarding therebetween. A research project on the use of LTE equipment to implement proximity D2D communication services was approved at the 3rd Generation Partnership Project (3GPP) RAN #63 plenary meeting in March 2014 (see Non-Patent Document 1). Functions introduced in the LTE Release 12 D2D include:

1) a discovery function between proximate devices in an LTE network coverage scenario;
2) a direct broadcast communication function between proximate devices; and
3) support for unicast and groupcast communication functions at higher layers.

A research project on enhanced LTE eD2D (enhanced D2D) was approved at the 3GPP RAN #66 plenary meeting in December 2014 (see Non-Patent Document 2). Main functions introduced in the LTE Release 13 eD2D include:

1) a D2D discovery in out-of-coverage and partial-coverage scenarios; and
2) a priority handling mechanism for D2D communication.

Based on the design of the D2D communication mechanism, a V2X feasibility research project based on D2D communication was approved at the 3GPP RAN #68 plenary meeting in June 2015. V2X stands for Vehicle to Everything, and is used to implement information exchange between a vehicle and all entities that may affect the vehicle, for the purpose of reducing accidents, alleviating traffic congestion, reducing environmental pollution, and providing other information services. Application scenarios of V2X mainly include four aspects:

1) V2V, Vehicle to Vehicle, i.e., vehicle-to-vehicle communication;
2) V2P, Vehicle to Pedestrian, i.e., a vehicle transmits alarms to a pedestrian or a non-motorized vehicle;
3) V2N: Vehicle to Network, i.e., a vehicle is connected to a mobile network;
4) V2I: Vehicle to Infrastructure, i.e., a vehicle communicates with a road infrastructure.

3GPP divides the research and standardization of V2X into three stages. The first stage was completed in September 2016, and mainly focused on V2V and was based on LTE Release 12 and Release 13 D2D (also known as sidelink communication), that is, the development of proximity communication technologies (see Non-Patent Document 3). V2X stage 1 introduced a new D2D communication interface referred to as PC5 interface. The PC5 interface is mainly used to address the issue of cellular Internet of Vehicle (IoV) communication in high-speed (up to 250 km/h) and high-node density environments. Vehicles can exchange information such as position, speed, and direction through the PC5 interface, that is, the vehicles can communicate directly through the PC5 interface. Compared with the proximity communication between D2D devices, functions introduced in LTE Release 14 V2X mainly include:

1) higher density DMRS to support high-speed scenarios;
2) introduction of sub-channels to enhance resource assignment methods; and
3) introduction of a user equipment sensing mechanism with semi-persistent scheduling.

The second stage of the V2X research project belonged to the LTE Release 15 research category (see Non-Patent Document 4). Main features introduced included high-order 64QAM modulation, V2X carrier aggregation, short TTI transmission, as well as feasibility study of transmit diversity.

The corresponding third stage, V2X feasibility research project based on 5G NR network technologies (see Non-Patent Document 5), was approved at the 3GPP RAN #80 plenary meeting in June 2018.

At the 3GPP RAN1 #98 meeting in August 2019 (see Non-Patent Document 6), the following meeting conclusions were reached regarding resource reservation and indication of transmission mode 2 in NR sidelink:

In NR sidelink, at least for transmission mode 2, the maximum number of sidelink resources reserved for one sidelink transmission (including the current sidelink transmission) is [2 or 3 or 4].

Regardless of whether HARQ retransmission in sidelink communication is enabled or disabled, the foregoing maximum number of reserved sidelink resources is the same. For example, when HARQ retransmission is enabled, the maximum number of sidelink resources reserved for one sidelink transmission is 3, and when HARQ retransmission is disabled, the maximum number of sidelink resources reserved for one sidelink transmission is also 3.

At the 3GPP RAN1 #98bis meeting in October 2019 (see Non-Patent Document 7), the following meeting conclusions were reached regarding the foregoing maximum number of sidelink resources reserved for one sidelink transmission:

The maximum number of sidelink resources reserved for one sidelink transmission is 2 or 3, and the value 4 is not supported in NR sidelink.

When reservation of a sidelink resource for an initial transmission of a certain TB by means of indication information in SCI associated with another TB is disabled, the maximum number of sidelink resources reserved for one sidelink transmission is 3.

The maximum number of sidelink resources reserved for one sidelink transmission being 2 or 3 is configured or preconfigured in sidelink resource pool configuration information.

The solution of the present invention mainly includes a method in which NR sidelink user equipment determines a value of a frequency domain resource assignment indication field in sidelink control information (SCI).

PRIOR ART DOCUMENT

Non-Patent Documents

Non-Patent Document 1: RP-140518, Work item proposal on LTE Device to Device Proximity Services Non-Patent Document 2: RP-142311, Work Item Proposal for Enhanced LTE Device to Device Proximity Services Non-Patent Document 3: RP-152293, New WI proposal: Support for V2V services based on LTE sidelink Non-Patent Document 4: RP-170798, New WID on 3GPP V2X Phase 2

Non-Patent Document 5: RP-181480, New SID Proposal: Study on NR V2X

Non-Patent Document 6: RAN1 #98, Chairman notes, section 7.2.4.2.2

Non-Patent Document 7: RAN1 #98bis, Chairman notes, section 7.2.4.2.2

SUMMARY

In order to address at least part of the aforementioned issues, the present invention provides a method performed by user equipment, and user equipment.

The method performed by user equipment according to a first aspect of the present invention comprises: receiving sidelink scheduling information; determining the number N of sidelink time-frequency resources; and determining a value of a frequency domain resource assignment indication field in sidelink control information (SCI), wherein the sidelink control information (SCI) is transmitted on an i-th sidelink time-frequency resource ($1 \leq i \leq N$), and the value of the frequency domain resource assignment indication field in the SCI indicates frequency domain resource(s) of the i-th, (i+1)-th, . . . , and N-th sidelink time-frequency resource.

According to the method performed by user equipment according to the first aspect of the present invention, the sidelink scheduling information is transmitted via downlink control information (DCI) transmitted by a base station; or, the sidelink scheduling information is a sidelink configured grant configured via a radio resource control (RRC) information element.

According to the method performed by user equipment according to the first aspect of the present invention, the sidelink scheduling information comprises a time domain resource assignment indication field; and the number N of sidelink time-frequency resources is determined according to the time domain resource assignment indication field.

User equipment according to a second aspect of the present invention comprises: a processor; and a memory storing instructions, wherein the instructions, when run by the processor, perform the method according to the first aspect.

BRIEF DESCRIPTION OF THE DRAWINGS

The above and other features of the present invention will be more apparent from the following detailed description in combination with the accompanying drawings, in which.

DETAILED DESCRIPTION

Figure 1:
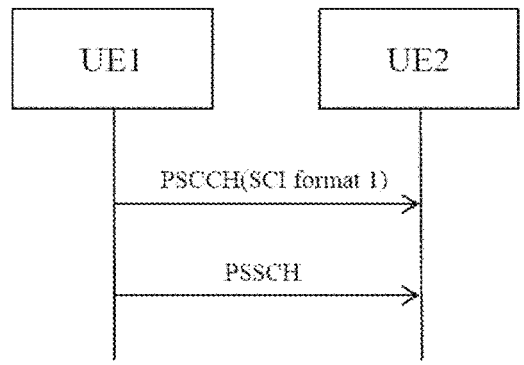
FIG. 1 is a schematic diagram showing sidelink communication of LTE V2X UE.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

In the following description, a 5G mobile communication system and its later evolved versions are used as exemplary application environments to set forth a plurality of embodiments according to the present invention in detail. However, it is to be noted that the present invention is not limited to the following implementations, but is applicable to many other wireless communication systems, such as a communication system after 5G and a 4G mobile communication system before 5G.

Some terms involved in the present invention are described below. Unless otherwise specified, the terms used in the present invention adopt the definitions herein. The terms given in the present invention may vary in LTE, LTE-Advanced, LTE-Advanced Pro, NR, and subsequent communication systems, but unified terms are used in the present invention. When applied to a specific system, the terms may be replaced with terms used in the corresponding system.

3GPP: 3rd Generation Partnership Project
LTE: Long Term Evolution
NR: New Radio
PDCCH: Physical Downlink Control Channel
DCI: Downlink Control Information
PDSCH: Physical Downlink Shared Channel
UE: User Equipment
eNB: evolved NodeB, evolved base station
gNB: NR base station
TTI: Transmission Time Interval
OFDM: Orthogonal Frequency Division Multiplexing
CP-OFDM: Cyclic Prefix Orthogonal Frequency Division Multiplexing
C-RNTI: Cell Radio Network Temporary Identifier
CSI: Channel State Information
HARQ: Hybrid Automatic Repeat Request
CSI-RS Channel State Information Reference signal
CRS: Cell Reference Signal
PUCCH: Physical Uplink Control Channel
PUSCH: Physical Uplink Shared Channel
UL-SCH: Uplink Shared Channel
CG: Configured Grant
Sidelink: Sidelink communication
SCI: Sidelink Control Information
PSCCH: Physical Sidelink Control Channel
MCS: Modulation and Coding Scheme
RB: Resource Block
RE: Resource Element
CRB: Common Resource Block
CP: Cyclic Prefix PRB: Physical Resource Block
PSSCH: Physical Sidelink Shared Channel
FDM: Frequency Division Multiplexing
RRC: Radio Resource Control
RSRP: Reference Signal Receiving Power
SRS: Sounding Reference Signal
DMRS: Demodulation Reference Signal
CRC: Cyclic Redundancy Check
PSDCH: Physical Sidelink Discovery Channel
PSBCH: Physical Sidelink Broadcast Channel
SFI Slot Format Indication
TDD: Time Division Duplexing
FDD: Frequency Division Duplexing
SIB1: System Information Block Type 1
SLSS: Sidelink Synchronization Signal
PSSS: Primary Sidelink Synchronization Signal
SSSS: Secondary Sidelink Synchronization Signal
PCI: Physical Cell ID
PSS: Primary Synchronization Signal
SSS: Secondary Synchronization Signal
BWP: Bandwidth Part
GNSS: Global Navigation Satellite System
SFN: System Frame Number (radio frame number)
DFN: Direct Frame Number
IE: Information Element
SSB: Synchronization Signal Block
EN-DC: EUTRA-NR Dual Connection
MCG: Master Cell Group
SCG: Secondary Cell Group
PCell: Primary Cell
SCell: Secondary Cell
PSFCH: Physical Sidelink Feedback Channel
SPS: Semi-Persistent Scheduling
TA Timing Advance
PT-RS: Phase-Tracking Reference Signal
TB: Transport Block
CB: Code Block
QPSK: Quadrature Phase Shift Keying
16/64/256 QAM: 16/64/256 Quadrature Amplitude Modulation
AGC: Automatic Gain Control
TDRA (field): Time Domain Resource Assignment indication (field)
FDRA (field): Frequency Domain Resource Assignment indication (field)

The following is a description of the prior art associated with the solution of the present invention. Unless otherwise specified, the same terms in the specific embodiments have the same meanings as in the prior art.

It is worth pointing out that the V2X and sidelink mentioned in the description of the present invention have the same meaning. The V2X herein can also mean sidelink; similarly, the sidelink herein can also mean V2X, and no specific distinction and limitation will be made in the following text.

The resource assignment mode of V2X (sidelink) communication and the transmission mode of V2X (sidelink) communication in the description of the present invention can be replaced equivalently. The resource assignment mode involved in the description can mean transmission mode, and the transmission mode involved can mean resource assignment mode. In NR sidelink, transmission mode 1 represents a base station scheduling-based transmission mode (resource assignment mode), and transmission mode 2 represents a user equipment sensing-based and resource selection-based transmission mode (resource assignment mode).

The PSCCH in the description of the present invention is used to carry SCI. The PSSCH associated with or relevant to or corresponding to or scheduled by PSCCH involved in the description of the present invention has the same meaning, and all refer to an associated PSSCH or a corresponding PSSCH. Similarly, the SCI (including first stage SCI and second stage SCI) associated with or relevant to or corresponding to PSSCH involved in the description has the same meaning, and all refer to associated SCI or corresponding SCI. It is worth pointing out that the first stage SCI, referred to as 1st stage SCI or SCI format 0-1, is transmitted in the PSCCH; and the second stage SCI, referred to as 2nd stage SCI or SCI format 0-2, is transmitted in resources of the corresponding PSSCH.

$\Sigma_{i=1}^{m-1} f(i)$ in the description of the present invention represents performing an adding operation on $f(1)$, $f(2), \ldots, f(m-1)$.

In the description of the present invention, the sidelink scheduling information transmitted by the base station indicates that the number of sidelink time-frequency resources is N. On the i-th ($1 \leq i \leq N$) sidelink resource, if the user equipment transmits a PSCCH and a corresponding PSSCH, then a corresponding indication field in SCI, such as the frequency domain resource assignment indication field in SCI format 0-1, is set according to the method of the present patent. It is worth pointing out that on a certain sidelink resource indicated by the base station, the user equipment may also not transmit a PSCCH and a corresponding PSSCH, and the present invention does not set any limitations on this.

Sidelink Communication Scenario

1) Out-of-coverage sidelink communication: Both of two UEs performing sidelink communication are out of network coverage (for example, the UE cannot detect any cell that meets a "cell selection criterion" on a frequency at which sidelink communication needs to be performed, and that means the UE is out of network coverage).

2) In-coverage sidelink communication: Both of two UEs performing sidelink communication are in network coverage (for example, the UE detects at least one cell that meets a "cell selection criterion" on a frequency at which sidelink communication needs to be performed, and that means the UE is in network coverage).

3) Partial-coverage sidelink communication: One of two UEs performing sidelink communication is out of network coverage, and the other is in network coverage.

From the perspective of a UE side, the UE has only two scenarios, out-of-coverage and in-coverage. Partial-coverage is described from the perspective of sidelink communication.

Basic Procedure of LTE V2X (Sidelink) Communication

FIG. 1 is a schematic diagram showing sidelink communication of LTE V2X UE. First, UE1 transmits to UE2 sidelink control information (SCI format 1), which is carried by a physical layer channel PSCCH. SCI format 1 includes scheduling information of a PSSCH, such as frequency domain resources and the like of the PSSCH. Secondly, UE1 transmits to UE2 sidelink data, which is carried by the physical layer channel PSSCH. The PSCCH and the corresponding PSSCH are frequency division multiplexed, that is, the PSCCH and the corresponding PSSCH are located in the same subframe in the time domain but are located on different RBs in the frequency domain. Specific design methods of the PSCCH and the PSSCH are as follows:

1) The PSCCH occupies one subframe in the time domain and two consecutive RBs in the frequency domain. Initialization of a scrambling sequence uses a predefined value of 510. The PSCCH may carry SCI format 1, where SCI format 1 at least includes frequency domain resource information of the PSSCH. For example, for a frequency domain resource indication field, SCI format 1 indicates a starting sub-channel number and the number of consecutive sub-channels of the PSSCH corresponding to the PSCCH.

2) The PSSCH occupies one subframe in the time domain, and the PSSCH and the corresponding PSCCH are frequency division multiplexed. The PSSCH occupies one or a plurality of consecutive sub-channels in the frequency domain. The sub-channel represents $n_{subCHsize}$ consecutive RBs in the frequency domain. $n_{subCHsize}$ is configured by an RRC parameter, and a starting sub-channel and the number of consecutive sub-channels are indicated by the frequency domain resource indication field of SCI format 1.

Resource Assignment Mode (Transmission Mode 3/4) of LTE V2X

Figure 2:
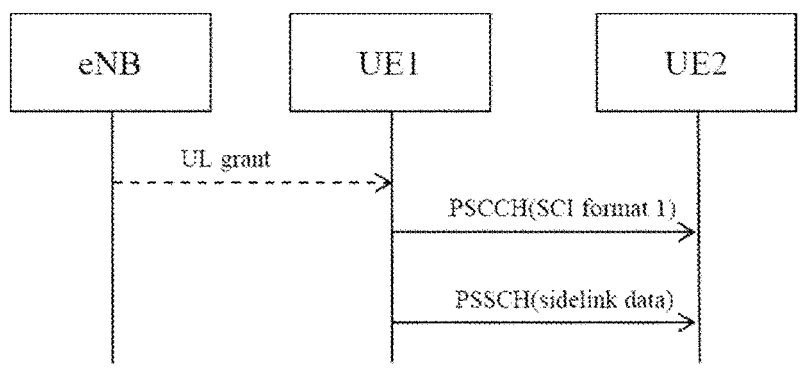
FIG. 2 is a schematic diagram showing a resource assignment mode of LTE V2X.

FIG. 2 shows two resource assignment modes of LTE V2X, which are referred to as base station scheduling-based resource assignment (transmission mode 3) and UE sensing-based resource assignment (transmission mode 4), respectively. In NR sidelink, transmission mode 3 in LTE V2X corresponds to transmission mode 1 in NR V2X, and is a base station scheduling-based transmission mode, and transmission mode 4 in LTE V2X corresponds to transmission mode 2 in NR V2X, and is a UE sensing-based transmission mode. In LTE V2X, when there is eNB network coverage, a base station can configure, through UE-level dedicated RRC signaling SL-V2X-ConfigDedicated, a resource assignment mode of UE, or referred to as a transmission mode of the UE, which is specifically as follows:

1) Base station scheduling-based resource assignment mode (transmission mode 3): the base station scheduling-based resource assignment mode means that frequency domain resources used in sidelink communication are scheduled by the base station. Transmission mode 3 includes two scheduling modes, which are dynamic scheduling and semi-persistent scheduling (SPS), respectively. For dynamic scheduling, a UL grant (DCI format 5A) includes the frequency domain resources of the PSSCH, and a CRC of a PDCCH or an EPDCCH carrying the DCI format 5A is scrambled by an SL-V-RNTI. For semi-persistent scheduling (SPS), the base station configures one or a plurality of (at most 8) configured grants through IE: SPS-ConfigSL-r14, and each configured grant contains a grant index and a resource period of the grant. The UL grant (DCI format 5A) includes the frequency domain resource of the PSSCH, indication information (3 bits) of the grant index, and indication information of SPS activation or release (or deactivation). The CRC of the PDCCH or the EPDCCH carrying the DCI format 5A is scrambled by an SL-SPS-V-RNTI.

Specifically, when RRC signaling SL-V2X-ConfigDedicated is set to scheduled-r14, it indicates that the UE is configured in the base station scheduling-based transmission mode. The base station configures the SL-V-RNTI or the SL-SPS-V-RNTI via RRC signaling, and transmits the UL grant to the UE through the PDCCH or the EPDCCH (DCI format 5A, the CRC is scrambled by the SL-V-RNTI or the SL-SPS-V-RNTI). The UL grant includes at least scheduling information of the PSSCH frequency domain resource in sidelink communication. When the UE successfully detects the PDCCH or the EPDCCH scrambled by the SL-V-RNTI or the SL-SPS-V-RNTI, the UE uses a PSSCH frequency domain resource indication field in the UL grant (DCI format 5A) as PSSCH frequency domain resource indication information in a PSCCH (SCI format 1), and transmits the PSCCH (SCI format 1) and a corresponding PSSCH.

For SPS in transmission mode 3, the UE receives, on a downlink subframe n, the DCI format 5A scrambled by the SL-SPS-V-RNTI. If the DCI format 5A includes the indication information of SPS activation, then the UE determines frequency domain resources of the PSSCH according to the indication information in the DCI format 5A, and determines time domain resources of the PSSCH (transmission subframes of the PSSCH) according to information such as the subframe n and the like.

2) UE sensing-based resource assignment mode (transmission mode 4): The UE sensing-based resource assignment mode means that resources used in sidelink communication are based on a procedure of sensing, by the UE, a candidate available resource set. When the RRC signaling SL-V2X-ConfigDedicated is set to ue-Selected-r14, it is indicated that the UE is configured to be in the UE sensing-based transmission mode. In the UE sensing-based transmission mode, the base station configures an available transmission resource pool, and the UE determines a PSSCH sidelink transmission resource in the transmission resource pool according to a certain rule (for a detailed description of the procedure, see the LTE V2X UE sensing procedure section), and transmits a PSCCH (SCI format 1) and a corresponding PSSCH.

Sidelink Resource Pool

In sidelink communication, resources transmitted and received by UEs all belong to resource pools. For example, for a base station scheduling-based transmission mode in sidelink communication, the base station schedules transmission resources for sidelink UE in the resource pool; alternatively, for a UE sensing-based transmission mode in sidelink communication, the UE determines a transmission resource in the resource pool.

Numerologies in NR (Including NR Sidelink) and Slots in NR (Including NR Sidelink)

A numerology comprises two aspects: a subcarrier spacing and a cyclic prefix (CP) length. NR supports five subcarrier spacings, which are respectively 15 kHz, 30 kHz, 60 kHz, 120 kHz and 240 kHz (corresponding to $\mu$=0, 1, 2, 3, 4). Table 4.2-1 shows the supported transmission numerologies specifically as follows:

TABLE 4.2-1

Subcarrier Spacings Supported by NR

| $\mu$ | $\Delta f = 2^\mu \cdot 15[kHz]$ | CP (cyclic prefix) |
|---|---|---|
| 0 | 15 | Normal |
| 1 | 30 | Normal |
| 2 | 60 | Normal, extended |
| 3 | 120 | Normal |
| 4 | 240 | Normal |

Only when $\mu$=2, that is, in the case of a 60 kHz subcarrier spacing, an extended CP is supported, whereas only a normal CP is supported in the case of other subcarrier spacings. For a normal CP, each slot includes 14 OFDM symbols; for an extended CP, each slot includes 12 OFDM symbols. For $\mu$=0, that is, a 15 kHz subcarrier spacing, one slot=1 ms; $\mu$=1, namely, a 30 kHz subcarrier spacing, one slot=0.5 ms; $\mu$=2, namely, a 60 kHz subcarrier spacing, one slot=0.25 ms, and so on.

NR and LTE have the same definition for a subframe, which denotes 1 ms. For a subcarrier spacing configuration $\mu$, a slot number in one subframe (1 ms) may be expressed as $n_s^\mu$, and ranges from 0 to $N_{slot}^{subframe,\mu}-1$. A slot number in one system frame (having a duration of 10 ms) may be expressed as $n_{s,f}^\mu$, and ranges from 0 to $N_{slot}^{frame,\mu}-1$. Definitions of $N_{slot}^{subframe,\mu}$ and $N_{slot}^{frame,\mu}$ for different subcarrier spacings p are shown in the tables below.

TABLE 4.3.2-1 the number of symbols included in each slot, the number of slots included in each system frame, and the number of slots included in each subframe for the normal CP

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4.3.2-2 the number of symbols included in each slot, the number of slots included in each system frame, and the number of slots included in each subframe for the extended CP (60 kHz)

| μ | $N_{symb}^{slot}$ | $N_{slot}^{frame,\mu}$ | $N_{slot}^{subframe,\mu}$ |
|---|---|---|---|
| 2 | 12 | 40 | 4 |

On an NR carrier, a system frame (or simply referred to as frame) number (SFN) ranges from 0 to 1023. The concept of a direct system frame number DFN is introduced to sidelink communication, and the number likewise ranges from 0 to 1023. The above description of the relationship between the system frame and the numerology can also be applied to a direct system frame. For example, a duration of one direct system frame is likewise equal to 10 ms; for a 15 kHz subcarrier spacing, one direct system frame includes 10 slots, and so on. The DFN is applied to timing on a sidelink carrier.

Parameter Sets in LTE (Including LTE V2X) and Slots and Subframes in LTE (Including LTE V2X)

The LTE only supports a 15 kHz subcarrier spacing. Both the extended CP and the normal CP are supported in the LTE. The subframe has a duration of 1 ms and includes two slots. Each slot has a duration of 0.5 ms.

For a normal CP, each subframe includes 14 OFDM symbols, and each slot in the subframe includes 7 OFDM symbols; for an extended CP, each subframe includes 12 OFDM symbols, and each slot in the subframe includes 6 OFDM symbols.

Resource Block (RB) and Resource Element (RE)

The resource block (RB) is defined in the frequency domain as $N_{sc}^{RB}=12$ consecutive subcarriers. For example, for a 15 kHz subcarrier spacing, the RB is 180 kHz in the frequency domain. For a 15 kHz×$2^\mu$ subcarrier spacing, the resource element (RE) represents one subcarrier in the frequency domain and one OFDM symbol in the time domain.

Maximum Number of Sidelink Resources Reserved for One Sidelink Transmission

In the description of the present patent, the maximum number of sidelink resources reserved for one sidelink transmission represents the maximum number (expressed as $N_{max}$) of sidelink resources indicated in a current sidelink transmission, and the maximum number of sidelink resources includes the current sidelink resource. For example, if $N_{max}=3$, in a certain sidelink transmission, two additional sidelink time-frequency resources at most may be indicated by SCI. That is, one additional sidelink time-frequency resource or two additional sidelink time-frequency resources, or no additional sidelink time-frequency resource is indicated in the SCI. With respect to $N_{max}$, the following description is further provided:

The maximum number of sidelink resources reserved for one sidelink transmission is 2 or 3. That is, $N_{max}=2$ or 3.

When reservation of a sidelink resource for an initial transmission of a certain TB by means of indication information in SCI associated with another TB is disabled, the maximum number $N_{max}$ of sidelink resources reserved for one sidelink transmission is 3.

$N_{max}=2$ or 3 is configured or preconfigured in sidelink resource pool configuration information.

Interpretation of Time Domain Resource Indication Field in NR Sidelink DCI Format 3_0 and SCI Format 0-1

In NR sidelink, DCI format 3_0 is used to schedule a PSCCH and a PSSCH, and is used for transmission mode 1. SCI format 0-1 is used to schedule a PSSCH and second stage SCI carried on the PSSCH. DCI format 3_0 and SCI format 0-1 both include a time domain resource indication field (or a field). In addition, an interpretation mode of the time domain resource indication field in DCI format 3_0 and an interpretation mode of the time domain resource indication field in SCI format 0-1 are the same, as shown below (a value of the time domain resource indication field is expressed as TRIV):

If N=1,
 then TRIV=0;
otherwise, if N=2,
 then TRIV=T1;
otherwise
 if (T2−T1−1)≤15
  then TRIV=30(T2−T1−1)+T1+31;
 otherwise,
  then TRIV=30(31−T2+T1)+62−T1.

N represents the actually indicated number of sidelink resources, where N≤$N_{max}$.

T1 represents a time domain offset of an additional first sidelink resource, and T2 represents a time domain offset of an additional second sidelink resource, where:
 for N=2, 1≤T1≤31;
 for N=3, 1≤T1≤30, T1<T2≤31.

The interpretation mode of the aforementioned time domain resource indication field is one to one mapping. That is, when user equipment receives DCI format 3_0 or SCI format 0-1, according to the value TRIV of the time domain resource indication field in combination with the aforementioned calculation and mapping relationships between TRIV and T1 and between TRIV and T2, only one T1 (equivalent to determining that N=2) or only one group (T1, T2) (equivalent to determining that N=3), or N=1 (indicating that no additional sidelink resource indication is present, and only a current resource indication is included) can be determined. It is worth pointing out that, for N=1, TRIV=0; for N=2, 1≤TRIV≤31; and for N=3, TRIV>31.

Interpretation of Frequency Domain Resource Indication Field in NR Sidelink DCI Format 3_0 and SCI Format 0-1

For NR sidelink, similar to LTE V2X, frequency domain resource assignment is performed in units of sub-channel. One sub-channel includes multiple RBs, and frequency domain resource assignment is performed in an integer number of sub-channels.

DCI format 3_0 and SCI format 0-1 both include a frequency domain resource indication field (or a field). In addition, an interpretation mode of the frequency domain resource indication field in DCI format 3_0 and an interpretation mode of the frequency domain resource indication field in SCI format 0-1 are the same, as shown below (a value of the frequency domain resource indication field is expressed as r):

for $N_{max}=2$,
then $r=f2+\Sigma_{i=1}^{m-1}(N_{subchannel}^{SL}+1-i)$;
for $N_{max}=3$,
then $r=f2+f3\cdot(N_{subchannel}^{SL}+1-m)-\Sigma_{i=1}^{m-1}(N_{subchannel}^{SL}+1-i)^2$.
wherein $N_{subchannel}^{SL}$ represents the number of sub-channels (pre-) configured in resource pool configuration information;

f2 represents an index (or number) of a lowest sub-channel of the second sidelink resource;

f3 represents an index (or number) of a lowest sub-channel of the third sidelink resource;

m represents the number of sub-channels in a frequency domain resource assignment.

After the user equipment determines the value of $N_{max}$, the UE may determine only one group of f2 and m, or only one group of f2, f3 and m according to the value r of the frequency domain resource indication field in received DCI format 3_0 or SCI format 0-1 in combination with the aforementioned calculation method for determining r.

Hereinafter, specific examples and embodiments related to the present invention are described in detail. In addition, as described above, the examples and embodiments described in the present disclosure are illustrative descriptions for facilitating understanding of the present invention, rather than limiting the present invention.

Embodiment 1

Figure 3:
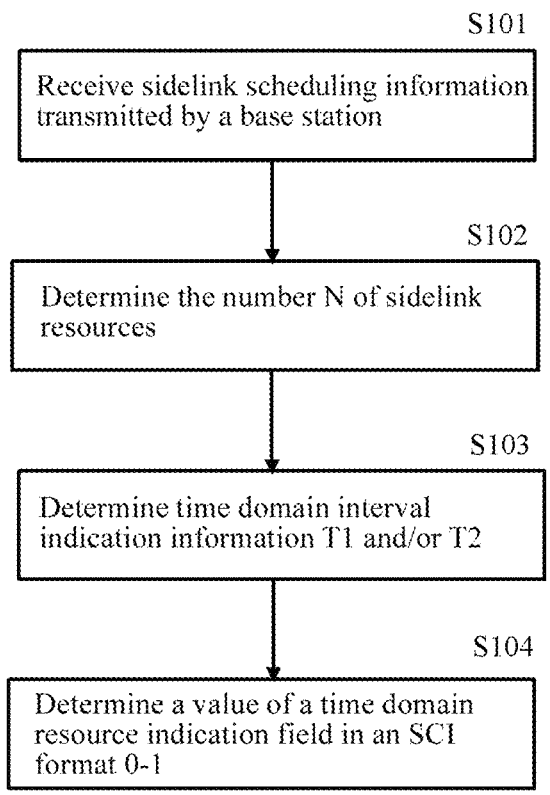
FIG. 3 is a schematic diagram showing a basic procedure of a method performed by user equipment according to Embodiment 1 of the invention.

FIG. 3 is a schematic diagram showing a basic procedure of a method performed by user equipment according to Embodiment 1 of the present invention.

The method performed by user equipment according to Embodiment 1 of the present invention is described in detail below in conjunction with the basic procedure diagram shown in FIG. 3.

As shown in FIG. 3, in Embodiment 1 of the present invention, the steps performed by the user equipment include the following:

In step S101, sidelink user equipment receives sidelink scheduling information transmitted by a base station.

Optionally, the sidelink scheduling information is DCI format 3_0 including a time domain resource assignment indication field.

Alternatively, optionally, the sidelink scheduling information is RRC signaling (or an RRC information element) including time domain resource assignment indication information. The RRC signaling (or the RRC information element) is expressed as SL-ConfiguredGrantConfig.

In step S102, the sidelink user equipment determines the number N of sidelink resources indicated by the sidelink scheduling information.

Optionally, the user equipment determines N according to a value TRIV of the time domain resource assignment indication field, or, optionally, the user equipment determines N according to a value TRIV of the time domain resource assignment indication information.

In step S103, the sidelink user equipment determines time domain resource interval indication information T1 and/or T2.

Optionally, the user equipment determines T1 and/or T2 according to the value TRIV of the time domain resource assignment indication field, or, optionally, the user equipment determines T1 and/or T2 according to the value TRIV of the time domain resource assignment indication information.

In step S104, the user equipment determines a value TRIV' of a time domain resource indication field in an SCI format 0-1.

Optionally, if N=1, then the user equipment sets the value TRIV' of the time domain resource indication field in the SCI format 0-1 to be TRIV or 0.

Optionally, if N=2,
optionally, the user equipment sets, on a first sidelink resource indicated by the sidelink scheduling information, the value TRIV' of the time domain resource indication field in the SCI format 0-1 to be TRIV; and
optionally, the user equipment sets, on a second sidelink resource indicated by the sidelink scheduling information, the value TRIV' of the time domain resource indication field in the SCI format 0-1 to be 0;

Optionally, if N=3,
optionally, the user equipment sets, on the first sidelink resource indicated by the sidelink scheduling information, the value TRIV' of the time domain resource indication field in the SCI format 0-1 to be TRIV;
optionally, the user equipment sets, on the second sidelink resource indicated by the sidelink scheduling information, the value TRIV' of the time domain resource indication field in the SCI format 0-1 to be equal to (T2−T1); and
optionally, the user equipment sets, on a third sidelink resource indicated by the sidelink scheduling information, the value TRIV' of the time domain resource indication field in the SCI format 0-1 to be 0.

Embodiment 2

Figure 4:
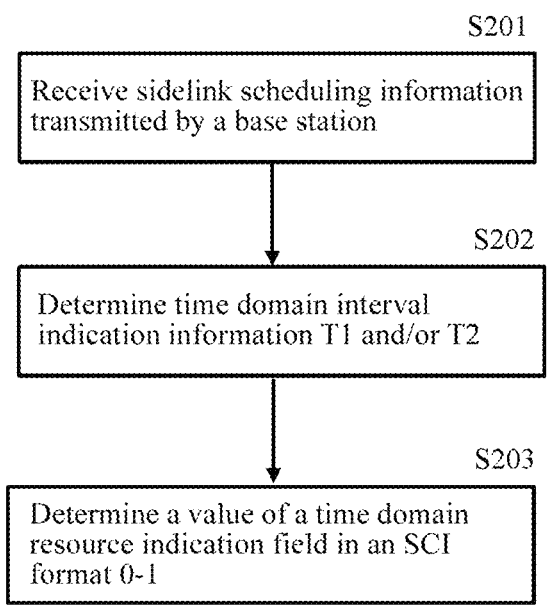
FIG. 4 is a schematic diagram showing a basic procedure of a method performed by user equipment according to Embodiment 2 of the invention.

FIG. 4 is a schematic diagram showing a basic procedure of a method performed by user equipment according to Embodiment 2 of the present invention.

The method performed by user equipment according to Embodiment 2 of the present invention is described in detail below in conjunction with the basic procedure diagram shown in FIG. 4.

As shown in FIG. 4, in Embodiment 2 of the present invention, the steps performed by the user equipment include the following:

In step S201, sidelink user equipment receives sidelink scheduling information transmitted by a base station.

Optionally, the sidelink scheduling information is DCI format 3_0 including a time domain resource assignment indication field.

Alternatively, optionally, the sidelink scheduling information is RRC signaling (or an RRC information element) including time domain resource assignment indication information. The RRC signaling (or the RRC information element) is expressed as SL-ConfiguredGrantConfig.

In step S202, the sidelink user equipment determines time domain resource interval indication information T1 and/or T2.

Optionally, the user equipment determines T1 and/or T2 according to a value TRIV of the time domain resource assignment indication field, or, optionally, the user equipment determines T1 and/or T2 according to a value TRIV of the time domain resource assignment indication information.

In step S203, the user equipment determines a value TRIV' of a time domain resource indication field in an SCI format 0-1.

Optionally, if TRIV=0, then the user equipment sets the value TRIV' of the time domain resource indication field in the SCI format 0-1 to be 0.

Optionally, if 1≤TRIV≤31,
optionally, the user equipment sets, on a first sidelink resource indicated by the sidelink scheduling information, the value TRIV' of the time domain resource indication field in the SCI format 0-1 to be TRIV; and
optionally, the user equipment sets, on a second sidelink resource indicated by the sidelink scheduling information, the value TRIV' of the time domain resource indication field in the SCI format 0-1 to be 0.

Optionally, if TRIV>31,
optionally, the user equipment sets, on the first sidelink resource indicated by the sidelink scheduling information, the value TRIV' of the time domain resource indication field in the SCI format 0-1 to be TRIV;
optionally, the user equipment sets, on the second sidelink resource indicated by the sidelink scheduling information, the value TRIV' of the time domain resource indication field in the SCI format 0-1 to be equal to (T2−T1); and
optionally, the user equipment sets, on a third sidelink resource indicated by the sidelink scheduling information, the value TRIV' of the time domain resource indication field in the SCI format 0-1 to be 0.

Embodiment 3

Figure 5:
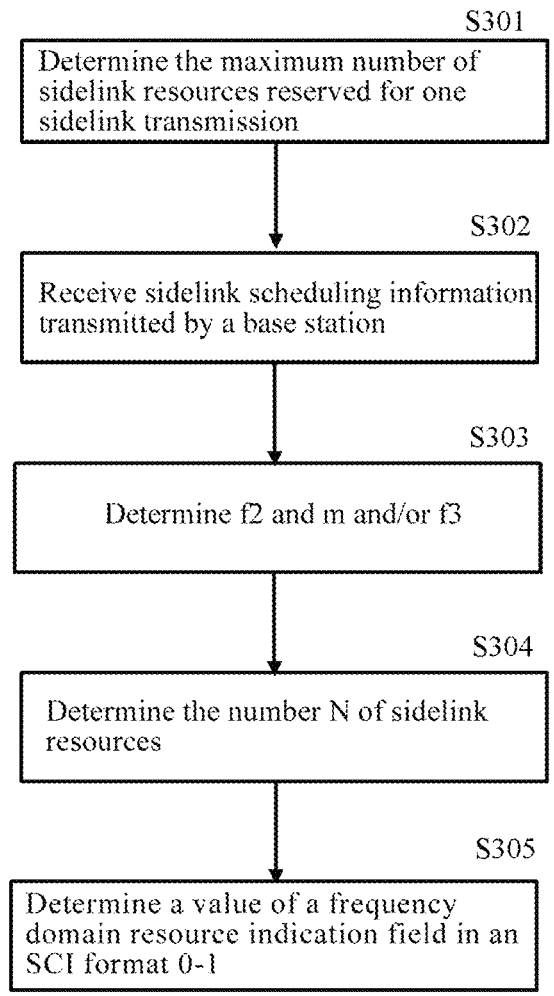
FIG. 5 is a schematic diagram showing a basic procedure of a method performed by user equipment according to Embodiment 3 of the invention.

FIG. 5 is a schematic diagram showing a basic procedure of a method performed by user equipment according to Embodiment 3 of the present invention.

The method performed by user equipment according to Embodiment 3 of the present invention is described in detail below in conjunction with the basic procedure diagram shown in FIG. 5.

As shown in FIG. 5, in Embodiment 3 of the present invention, the steps performed by the user equipment include the following:

In step S301, sidelink user equipment determines the maximum number of sidelink resources reserved for one sidelink transmission.

Optionally, the user equipment determines, according to sidelink resource pool configuration information, the maximum number of sidelink resources reserved for one sidelink transmission.

In step S302, the sidelink user equipment receives sidelink scheduling information transmitted by a base station.

Optionally, the sidelink scheduling information is DCI format 3_0 including a frequency domain resource assignment indication field and a time domain resource assignment indication field.

Alternatively,
optionally, the sidelink scheduling information is RRC signaling (or an RRC information element) including frequency domain resource assignment indication information and time domain resource assignment indication information. The RRC signaling (or the RRC information element) is expressed as SL-ConfiguredGrantConfig.

In step S303, the sidelink user equipment determines an index (or number) f2 of a lowest sub-channel of a second sidelink resource, and the number m of sub-channels in a sidelink frequency domain resource assignment, and/or an index f3 of a lowest sub-channel of a third sidelink resource.

Optionally, the user equipment determines f2 and m and/or f3 according to a value r of the frequency domain resource assignment indication field, or, optionally, the user equipment determines f2 and m and/or f3 according to a value r of the frequency domain resource assignment indication information.

In step S304, the sidelink user equipment determines the number N of sidelink resources indicated by the sidelink scheduling information.

Optionally, the user equipment determines N according to a value TRIV of the time domain resource assignment indication field, or, optionally, the user equipment determines N according to a value TRIV of the time domain resource assignment indication information.

In step S305, the user equipment determines a value r' of a frequency domain resource indication field in an SCI format 0-1.

Optionally, if N=1, then the user equipment sets the value r' of the frequency domain resource indication field in the SCI format 0-1 to be equal to r.

Optionally, if N=2,
optionally, the user equipment sets, on a first sidelink resource indicated by the sidelink scheduling information, the value r' of the frequency domain resource indication field in the SCI format 0-1 to be equal to r;
optionally, the user equipment performs the following on a second sidelink resource indicated by the sidelink scheduling information:
if $N_{max}=2$, then the user equipment sets the value r' of the frequency domain resource indication field in the SCI format 0-1 to be equal to r, or the user equipment sets the value r' of the frequency domain resource indication field in the SCI format 0-1 as follows:
$r'=f2'+\Sigma_{i=1}^{m-1}(N_{subchannel}^{SL}+1-i)$,
where f2' is a fixed non-negative integer (optionally 0), or is predefined, or is randomly selected by the user equipment, or is up to specific UE implementation;
$N_{subchannel}^{SL}$ represents the number of sub-channels (pre-)configured in resource pool configuration information.
if $N_{max}=3$, then the user equipment sets the value r' of the frequency domain resource indication field in the SCI format 0-1 to be equal to r, or the user equipment sets the value r' of the frequency domain resource indication field in the SCI format 0-1 as follows:
$r'=f2'+f3'\cdot(N_{subchannel}^{SL}+1-m)+\Sigma_{i=1}^{m-1}(N_{subchannel}^{SL}+1-i)^2$.
where f2' and f3' are each a fixed non-negative integer (optionally 0), or are predefined, or are randomly selected by the user equipment, or are up to specific UE implementation;
$N_{subchannel}^{SL}$ represents the number of sub-channels (pre-)configured in resource pool configuration information.

Optionally, if N=3,
optionally, the user equipment sets, on the first sidelink resource indicated by the sidelink scheduling information, the value r' of the frequency domain resource indication field in the SCI format 0-1 to be equal to r; and optionally, the user equipment sets, on the second sidelink resource indicated by the sidelink scheduling information, the value r' of the frequency domain resource indication field in the SCI format 0-1 as follows:
$r'=f2'+f3'\cdot(N_{subchannel}^{SL}+1-m)+\Sigma_{i=1}^{m-1}(N_{subchannel}^{SL}+1-i)^2$, where $f2'=f3$, and $f3'$ is a fixed non-negative integer (optionally 0), or is predefined, or is randomly selected by the user equipment, or is up to specific UE implementation;

$N_{subchannel}^{SL}$ represents the number of sub-channels (pre-)configured in resource pool configuration information.

optionally, the user equipment sets, on the third sidelink resource indicated by the sidelink scheduling information, the value r' of the frequency domain resource indication field in the SCI format 0-1 to be equal to r, or the user equipment sets the value r' of the frequency domain resource indication field in the SCI format 0-1 as follows: $r'=f2'+f3'\cdot(N_{subchannel}^{SL}+1-m)+\Sigma_{i=1}^{m-1}(N_{subchannel}^{SL}+1-i)^2$, where $f2'$ and $f3'$ are each a fixed non-negative integer (optionally 0), or are predefined, or are randomly selected by the user equipment, or are up to specific UE implementation;

$N_{subchannel}^{SL}$ represents the number of sub-channels (pre-)configured in resource pool configuration information.

Embodiment 4

Figure 6:
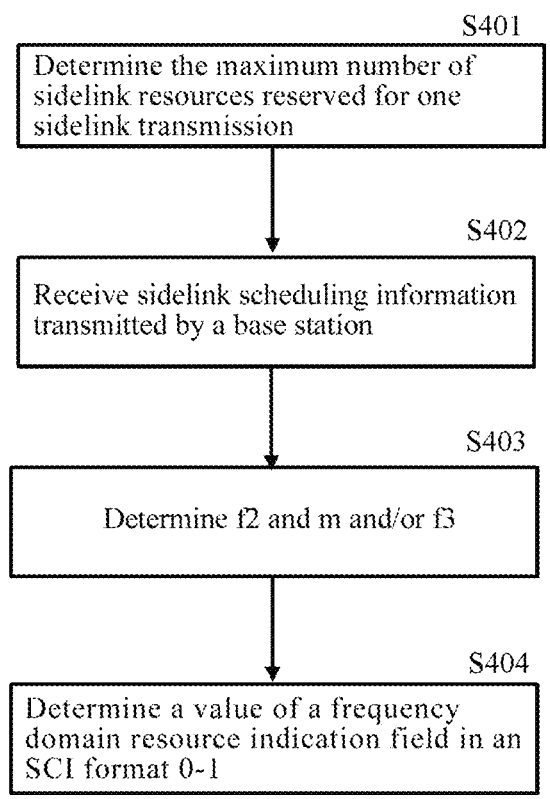
FIG. 6 is a schematic diagram showing a basic procedure of a method performed by user equipment according to Embodiment 4 of the invention.

FIG. 6 is a schematic diagram showing a basic procedure of a method performed by user equipment according to Embodiment 4 of the present invention.

The method performed by user equipment according to Embodiment 4 of the present invention is described in detail below in conjunction with the basic procedure diagram shown in FIG. 6.

As shown in FIG. 6, in Embodiment 4 of the present invention, the steps performed by the user equipment include the following:

In step S401, sidelink user equipment determines the maximum number of sidelink resources reserved for one sidelink transmission.

Optionally, the user equipment determines, according to sidelink resource pool configuration information, the maximum number of sidelink resources reserved for one sidelink transmission.

In step S402, the sidelink user equipment receives sidelink scheduling information transmitted by a base station.

Optionally, the sidelink scheduling information is DCI format 3_0 including a frequency domain resource assignment indication field and a time domain resource assignment indication field.

Alternatively, optionally, the sidelink scheduling information is RRC signaling (or an RRC information element) including frequency domain resource assignment indication information and time domain resource assignment indication information. The RRC signaling (or the RRC information element) is expressed as SL-ConfiguredGrantConfig.

In step S403, the sidelink user equipment determines an index (or number) f2 of a lowest sub-channel of a second sidelink resource, and the number m of sub-channels in a sidelink frequency domain resource assignment, and/or an index f3 of a lowest sub-channel of a third sidelink resource.

Optionally, the user equipment determines f2 and m and/or f3 according to a value r of the frequency domain resource assignment indication field, or, optionally, the user equipment determines f2 and m and/or f3 according to a value r of the frequency domain resource assignment indication information.

In step S404, the user equipment determines a value r' of a frequency domain resource indication field in an SCI format 0-1.

Optionally, if a value TRIV of the time domain resource assignment indication field or indication information is equal to 0, then the user equipment sets the value r' of the frequency domain resource indication field in the SCI format 0-1 to be equal to r.

Optionally, if the value TRIV of the time domain resource assignment indication field or indication information satisfies $1 \leq TRIV \leq 31$, optionally, the user equipment sets, on a first sidelink resource indicated by the sidelink scheduling information, the value r' of the frequency domain resource indication field in the SCI format 0-1 to be equal to r; and optionally, the user equipment performs the following on a second sidelink resource indicated by the sidelink scheduling information:

if $N_{max}=2$, then the user equipment sets the value r' of the frequency domain resource indication field in the SCI format 0-1 to be equal to r, or the user equipment sets the value r' of the frequency domain resource indication field in the SCI format 0-1 as follows: $r'=f2'+\Sigma_{i=1}^{m-1}(N_{subchannel}^{SL}+1-i)$, where $f2'$ is a fixed non-negative integer (optionally 0), or is predefined, or is randomly selected by the user equipment, or is up to specific UE implementation;

$N_{subchannel}^{SL}$ represents the number of sub-channels (pre-)configured in resource pool configuration information.

if $N_{max}=3$, then the user equipment sets the value r' of the frequency domain resource indication field in the SCI format 0-1 to be equal to r, or the user equipment sets the value r' of the frequency domain resource indication field in the SCI format 0-1 as follows: $r'=f2'+f3'\cdot(N_{subchannel}^{SL}+1-m)+\Sigma_{i=1}^{m-1}(N_{subchannel}^{SL}+1-i)^2$, where $f2'$ and $f3'$ are each a fixed non-negative integer (optionally 0), or are predefined, or are randomly selected by the user equipment, or are up to specific UE implementation;

$N_{subchannel}^{SL}$ represents the number of sub-channels (pre-)configured in resource pool configuration information.

Optionally, if the value TRIV of the time domain resource assignment indication field or indication information satisfies TRIV>31, optionally, the user equipment sets, on the first sidelink resource indicated by the sidelink scheduling information, the value r' of the frequency domain resource indication field in the SCI format 0-1 to be equal to r; and optionally, the user equipment sets, on the second sidelink resource indicated by the sidelink scheduling information, the value r' of the frequency domain resource indication field in the SCI format 0-1 as follows: $r'=f2'+f3'\cdot(N_{subchannel}^{SL}+1-m)+\Sigma_{i=1}^{m-1}(N_{subchannel}^{SL}+1-i)^2$, where f2'=f3, and f3' is a fixed non-negative integer (optionally 0), or is predefined, or is randomly selected by the user equipment, or is up to specific UE implementation;

$N_{subchannel}^{SL}$ represents the number of sub-channels (pre-)configured in resource pool configuration information.

optionally, the user equipment sets, on a third sidelink resource indicated by the sidelink scheduling information, the value r' of the frequency domain resource indication field in the SCI format 0-1 to be equal to r, or the user equipment sets the value r' of the frequency domain resource indication field in the SCI format 0-1 as follows: $r'=f2'+f3'\cdot(N_{subchannel}^{SL}+1-m)+\Sigma_{i=1}^{m-1}(N_{subchannel}^{SL}+1-i)^2$, where f2' and f3' are each a fixed non-negative integer (optionally 0), or are predefined, or are randomly selected by the user equipment, or are up to specific UE implementation;

$N_{subchannel}^{SL}$ represents the number of sub-channels (pre-)configured in resource pool configuration information.

Embodiment 51

Figure 7:
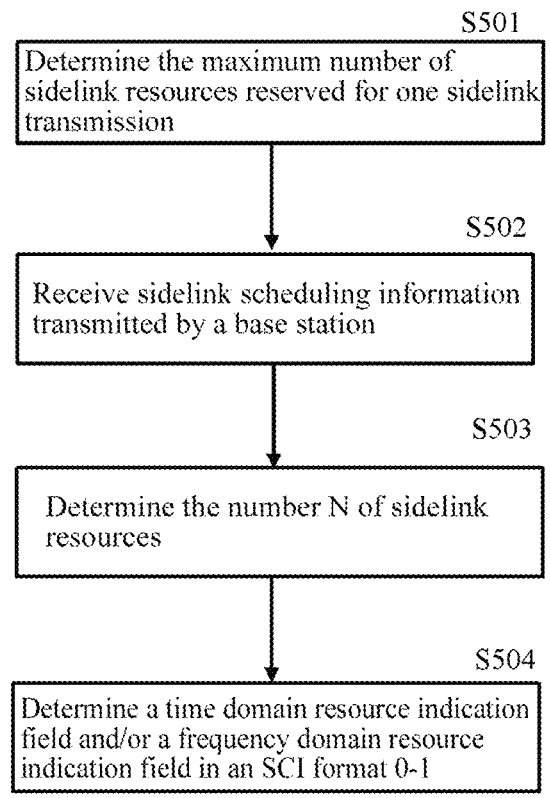
FIG. 7 is a schematic diagram showing a basic procedure of a method performed by user equipment according to Embodiment 5 of the invention.

FIG. 7 is a schematic diagram showing a basic procedure of a method performed by user equipment according to Embodiment 5 of the present invention.

The method performed by user equipment according to Embodiment 5 of the present invention is described in detail below in conjunction with the basic procedure diagram shown in FIG. 7.

As shown in FIG. 7, in Embodiment 5 of the present invention, the steps performed by the user equipment include the following:

In step S501, sidelink user equipment determines the maximum number $N_{max}$ of sidelink resources reserved for one sidelink transmission.

Optionally, the user equipment determines, according to sidelink resource pool configuration information, the maximum number $N_{max}$ of sidelink resources reserved for one sidelink transmission.

In step S502, the sidelink user equipment receives sidelink scheduling information transmitted by a base station.

Optionally, the sidelink scheduling information is DCI format 3_0 including a time domain resource assignment indication field and a frequency domain resource assignment indication field.

Alternatively, optionally, the sidelink scheduling information is RRC signaling (or an RRC information element) including time domain resource assignment indication information and frequency domain resource assignment indication information. The RRC signaling (or the RRC information element) is expressed as SL-ConfiguredGrantConfig.

Optionally, in step S503 (step S503 is an optional step), the sidelink user equipment determines the number N of sidelink time-frequency resources indicated by the sidelink scheduling information.

Optionally, the user equipment determines N according to a value TRIV of the time domain resource assignment indication field, or, optionally, the user equipment determines N according to a value TRIV of the time domain resource assignment indication information.

In step S504, the user equipment determines a time domain resource indication field and/or a frequency domain resource indication field in an SCI format 0-1.

Optionally, the user equipment sets the time domain resource indication field and/or the frequency domain resource indication field in the SCI format 0-1, such that (or, so as to meet the objective that) a sidelink time-frequency resource indicated in the SCI format 0-1 is in accordance with a sidelink time-frequency resource indicated by the sidelink scheduling information, and/or, optionally, assuming that a time-frequency resource of a sidelink transmission corresponding to the SCI format 0-1 is an i-th ($1 \leq i \leq N$) sidelink time-frequency resource indicated by the sidelink scheduling information, then the user equipment sets the time domain resource indication field and/or the frequency domain resource indication field in the SCI format 0-1 by means of indicating the i-th, (i+1)-th, ..., and N-th sidelink time-frequency resource (the total number being N−i+1) (or the (i+1)-th, ..., and N-th sidelink time-frequency resource, the total number being N−i), or the user equipment sets the time domain resource indication field and/or the frequency domain resource indication field in the SCI format 0-1, such that time domain resource indication information and/or frequency domain resource indication information in the SCI format 0-1 indicates the i-th, (i+1)-th, ..., and N-th sidelink time-frequency resource (the total number being N−i+1) (or the (i+1)-th, ..., and N-th sidelink time-frequency resource, the total number being N−i), and/or, optionally, if N−i+1<$N_{max}$ (or, if the number of sidelink time-frequency resources indicated by the SCI format 0-1 is less than then when the user equipment determines the frequency domain resource indication field in the SCI format 0-1, indexes (or numbers) of ($N_{max}$−(N−i+1)) lowest sub-channels indicated by the frequency domain resource indication field are up to UE implementation, or are fixed to 0 (or other non-negative integers), or are randomly selected by the user equipment. Specifically, if $N_{max}$−(N−i+1)=1 and $N_{max}$=2, then the index f2 of the one lowest sub-channel is up to UE implementation, or is a certain fixed integer, or is randomly selected by the user equipment, or the user equipment determines that the frequency domain resource indication field in the SCI format 0-1 is equal to the value of the frequency domain resource indication field or indication information in the sidelink scheduling information; and if $N_{max}$−(N−i+1)=1 and $N_{max}$=3, then the index f3 of the one lowest sub-channel is up to UE implementation, or is a certain fixed integer, or is randomly selected by the user equipment; and if $N_{max}$−(N−i+1)=2 and $N_{max}$=3, then the indexes f2 and f3 of the two lowest sub-channels are up to UE implementation, or are each a certain fixed integer, or are randomly selected by the user equipment, or the user equipment determines that the frequency domain resource indication field in the SCI format 0-1 is equal to the value of the frequency domain resource indication field or indication information in the sidelink scheduling information.

Figure 8:
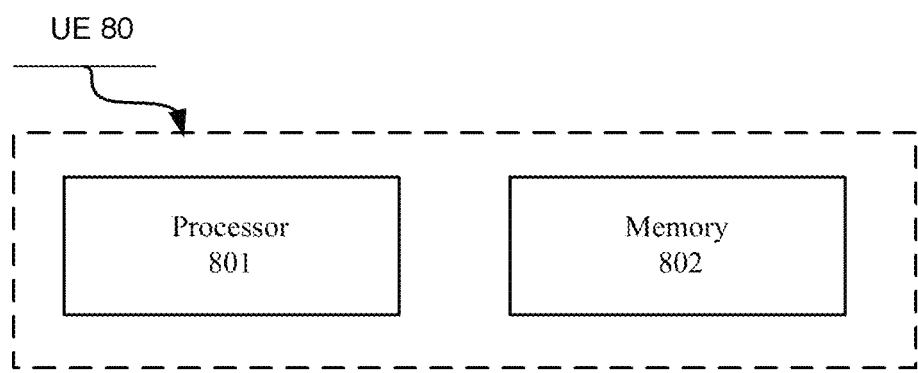
FIG. 8 is a block diagram showing user equipment according to an embodiment of the present invention.

FIG. 8 is a block diagram showing the user equipment (UE) involved in the present invention. As shown in FIG. 8, user equipment (UE) 80 includes a processor 801 and a memory 802. The processor 801 may include, for example, a microprocessor, a microcontroller, an embedded processor, and the like. The memory 802 may include, for example, a volatile memory (such as a random access memory (RAM)), a hard disk drive (HDD), a non-volatile memory (such as a flash memory), or other memories. The memory 802 stores program instructions. The instructions, when run by the processor 801, can perform the above method performed by user equipment as described in detail in the present invention.

The method and related equipment according to the present invention have been described above in combination with preferred embodiments. It should be understood by those skilled in the art that the method shown above is only exemplary, and the above embodiments can be combined with one another as long as no contradiction arises. The method of the present invention is not limited to the steps or sequences illustrated above. The network node and user equipment illustrated above may include more modules. For example, the network node and user equipment may further include modules that can be developed or will be developed in the future to be applied to a base station, an MME, or UE, and the like. Various identifiers shown above are only exemplary, and are not meant to limit the present invention. The present invention is not limited to specific information elements serving as examples of these identifiers. A person skilled in the art could make various alterations and modifications according to the teachings of the illustrated embodiments.

It should be understood that the above-described embodiments of the present invention may be implemented by software, hardware, or a combination of software and hardware. For example, various components of the base station and user equipment in the above embodiments can be implemented by multiple devices, and these devices include, but are not limited to: an analog circuit device, a digital circuit device, a digital signal processing (DSP) circuit, a programmable processor, an application specific integrated circuit (ASIC), a field programmable gate array (FPGA), and a complex programmable logic device (CPLD), and the like.

In this application, the "base station" may refer to a mobile communication data and control exchange center with large transmission power and a wide coverage area, including functions such as resource assignment and scheduling, data reception and transmission. "User equipment" may refer to a user mobile terminal, for example, including terminal devices that can communicate with a base station or a micro base station wirelessly, such as a mobile phone, a laptop computer, and the like.

In addition, the embodiments of the present invention disclosed herein may be implemented on a computer program product. More specifically, the computer program product is a product provided with a computer-readable medium having computer program logic encoded thereon. When executed on a computing device, the computer program logic provides related operations to implement the above technical solutions of the present invention. When executed on at least one processor of a computing system, the computer program logic causes the processor to perform the operations (methods) described in the embodiments of the present invention. Such setting of the present invention is typically provided as software, codes and/or other data structures provided or encoded on the computer readable medium, e.g., an optical medium (e.g., compact disc read-only memory (CD-ROM)), a flexible disk or a hard disk and the like, or other media such as firmware or micro codes on one or more read-only memory (ROM) or random access memory (RAM) or programmable read-only memory (PROM) chips, or a downloadable software image, a shared database and the like in one or more modules. Software or firmware or such configuration may be installed on a computing device such that one or more processors in the computing device implement the technical solutions described in the embodiments of the present invention.

In addition, each functional module or each feature of the base station device and the terminal device used in each of the above embodiments may be implemented or executed by a circuit, which is usually one or more integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general-purpose processor may be a microprocessor, or the processor may be an existing processor, a controller, a microcontroller, or a state machine. The aforementioned general-purpose processor or each circuit may be configured by a digital circuit, or may be configured by a logic circuit. Furthermore, when advanced technology capable of replacing current integrated circuits emerges due to advances in semiconductor technology, the present invention can also use integrated circuits obtained using this advanced technology.

While the present invention has been illustrated in combination with the preferred embodiments of the present invention, it will be understood by those skilled in the art that various modifications, substitutions, and alterations may be made to the present invention without departing from the spirit and scope of the present invention. Therefore, the present invention should not be limited by the above-described embodiments, but should be defined by the appended claims and their equivalents.

The invention claimed is:

1. A user equipment, comprising:
a processor; and
a memory, storing instructions,
wherein the processor executes the instructions to:
receive a sidelink scheduling information via Downlink Control Information (DCI) format 3_0, wherein a time domain resource assignment in the sidelink scheduling information indicates a number N of sidelink resources,
determine a value of a frequency domain resource assignment field, wherein for Sidelink Control Information (SCI) transmitted in an $i^{th}$ ($1 \le i \le N$) sidelink resource, the value of the frequency domain resource assignment field in the SCI indicates, according to whether i is equal to 1 or larger than 1, frequency resource(s) of all or only some of the multiple sidelink resources, and the all or only some of the multiple sidelink resources are $i^{th}$, $(i+1)^{th}$, ..., $N^{th}$ sidelink resource(s), and
transmit a Physical Sidelink Control Channel (PSCCH) with the SCI.

2. A method performed by user equipment, comprising:
receiving a sidelink scheduling information via Downlink Control Information (DCI) format 3_0, wherein a time domain resource assignment in the sidelink scheduling information indicates a number N of sidelink resources,
determining a value of a frequency domain resource assignment field, wherein for Sidelink Control Information (SCI) transmitted in an $i^{th}$ ($1 \le i \le N$) sidelink resource, the value of the frequency domain resource assignment field in the SCI indicates, according to whether i is equal to 1 or larger than 1, frequency resource(s) of all or only some of the multiple sidelink resources, and the all or only some of the multiple sidelink resources are $i^{th}$, $(i+1)^{th}$, ..., $N^{th}$ of sidelink resource(s), and transmitting a Physical Sidelink Control Channel (PSCCH) with the SCI.

\* \* \* \* \*